(12) United States Patent
Tamamura et al.

(10) Patent No.: US 10,570,046 B2
(45) Date of Patent: Feb. 25, 2020

(54) METHOD OF MANUFACTURING GLASS SHEET

(71) Applicant: Nippon Electric Glass Co., Ltd., Shiga (JP)

(72) Inventors: Shusaku Tamamura, Shiga (JP); Takahide Nakamura, Shiga (JP); Katsutoshi Fujiwara, Shiga (JP)

(73) Assignee: NIPPON ELECTRIC GLASS CO., LTD., Shiga (JP)

( * ) Notice: Subject to any disclaimer, the term of this patent is extended or adjusted under 35 U.S.C. 154(b) by 194 days.

(21) Appl. No.: 14/422,472

(22) PCT Filed: Aug. 20, 2013

(86) PCT No.: PCT/JP2013/072203
§ 371 (c)(1),
(2) Date: Feb. 19, 2015

(87) PCT Pub. No.: WO2014/030649
PCT Pub. Date: Feb. 27, 2014

(65) Prior Publication Data
US 2015/0218028 A1  Aug. 6, 2015

(30) Foreign Application Priority Data
Aug. 24, 2012  (JP) ................ 2012-185265

(51) Int. Cl.
C03B 17/06  (2006.01)
(52) U.S. Cl.
CPC .................. C03B 17/064 (2013.01)
(58) Field of Classification Search
CPC .................................... C03B 17/064
See application file for complete search history.

(56) References Cited

U.S. PATENT DOCUMENTS 1,731,260 A * 10/1929 Nobbe ............... C03B 17/064
                                                        65/195
3,537,834 A * 11/1970 Simon ............... C03B 17/064
                                                        65/121
(Continued)

FOREIGN PATENT DOCUMENTS

JP        5-139766       6/1993
JP     2003-081653       3/2003
(Continued)

OTHER PUBLICATIONS

International Search Report dated Oct. 8, 2013 in International (PCT) Application No. PCT/JP2013/072203.
(Continued)

*Primary Examiner* — John M Hoffmann
(74) *Attorney, Agent, or Firm* — Wenderoth, Lind & Ponack, L.L.P.

(57) ABSTRACT

An apparatus for manufacturing a glass sheet is configured to form the glass sheet by fusing streams of molten glass together at a lower edge of a forming device while causing the streams of molten glass to flow downward along outer surface portions of the forming device by an overflow downdraw method, the forming device including protruding pieces, which extend downward below the lower edge of the forming device, and are arranged at least at widthwise end portions of the lower edge of the forming device, the protruding pieces each having a distal end formed by a straight line substantially parallel to the lower edge of the forming device.

1 Claim, 13 Drawing Sheets

(56) References Cited

U.S. PATENT DOCUMENTS

| | | | |
|---|---|---|---|
| 2005/0183455 A1* | 8/2005 | Pitbladdo | C03B 17/064 65/29.11 |
| 2006/0236722 A1 | 10/2006 | Delia et al. | |
| 2006/0242994 A1* | 11/2006 | Boratav | C03B 17/064 65/90 |
| 2007/0130994 A1 | 6/2007 | Boratav et al. | |
| 2011/0100057 A1* | 5/2011 | Gaylo | C03B 17/064 65/90 |
| 2011/0244207 A1* | 10/2011 | Takaya | C03B 17/064 428/220 |
| 2012/0111060 A1* | 5/2012 | Tsuda | C03B 17/064 65/53 |
| 2012/0125048 A1 | 5/2012 | Godard et al. | |
| 2012/0272688 A1* | 11/2012 | Kano | C03B 18/06 65/195 |
| 2013/0074549 A1* | 3/2013 | Ahrens | C03B 17/06 65/29.21 |

FOREIGN PATENT DOCUMENTS

| | | |
|---|---|---|
| JP | 2008-526671 | 7/2008 |
| JP | 2008-539159 | 11/2008 |
| JP | 2009-518275 | 5/2009 |
| JP | 2010-189220 | 9/2010 |
| JP | 2012-171837 | 9/2012 |

OTHER PUBLICATIONS

English translation of International Preliminary Report on Patentability and Written Opinion dated Oct. 8, 2013 in PCT/JP2013/072203.

Japanese Office Action dated Sep. 27, 2016 in corresponding Japanese Patent Application No. 2013-538394 (with English Translation).

* cited by examiner

METHOD OF MANUFACTURING GLASS SHEET

TECHNICAL FIELD

The present invention relates to an improvement in a technology for manufacturing a glass sheet by an overflow downdraw method.

BACKGROUND ART

As is well known, as represented by a glass substrate for a flat panel display (FPD) such as a liquid crystal display, a plasma display, or an organic light-emitting diode (OLED) display, glass sheets utilized in various fields are actually required to satisfy a rigorous product quality requirement for surface defects and waviness.

Therefore, in order to satisfy such a requirement, an overflow downdraw method is widely employed as a method of manufacturing a glass sheet.

As illustrated in FIG. 11, this manufacturing method includes: pouring molten glass Gm into an overflow trough 2 formed in a top portion of a forming device 1; causing the molten glass Gm, which has overflowed to both sides from the overflow trough 2, to flow downward along outer surface portions 3 (each including a perpendicular surface portion 3a and an inclined surface portion 3b) of the forming device 1 having a substantially wedge shape; and fusing streams of the molten glass G together at a lower edge 4 of the forming device 1, thereby continuously forming a single glass sheet G. This manufacturing method has a feature in that both front and back surfaces of the glass sheet G thus formed are formed in a forming process without coming into contact with any area of the forming device 1, and hence a fire polished surface with extremely high flatness and smoothness and without defects such as flaws can be obtained.

Note that, the forming device 1 includes a guide wall portions 5 on both widthwise end portions (see, for example, JP 2008-526671 A and JP 2008-539159 A). Both widthwise end portions of the molten glass Gm, which has overflowed from the overflow trough 2, are guided downward along end surfaces of the guide wall portions 5 at a stage at which the molten glass G has reached the outer surface portions 3 of the forming device 1.

Further, for the purpose of suppressing contraction of the glass sheet G in the width direction, at a position immediately below the forming device 1, both widthwise edge portions of the glass sheet G are nipped by pairs of edge rollers (cooling rollers) 6 from both the front and back sides of the glass sheet G.

Technical Problem

By the way, when the streams of the molten glass Gm are to be fused together at the lower edge of the forming device 1 as illustrated in FIG. 12, the molten glass Gm may be released from the forming device 1 before the molten glass Gm is brought into contact with the lower edge of the forming device 1, and hence a space X may be formed between the lower edge of the forming device 1 and the glass sheet G (molten glass Gm).

When the space X is formed as described above, the following problem may arise.

That is, at the position immediately below the forming device 1, both widthwise edge portions Gb of the glass sheet G are easily cooled as compared to a widthwise center portion Ga of the glass sheet G, and hence both the edge portions Gb are lower in temperature than the center portion Ga. Thus, separate pieces of the glass sheet G are not easily fused in a spontaneous manner. Therefore, as illustrated in FIG. 13a, at the position immediately below the forming device 1, the widthwise edge portions Gb of the respective pieces of the glass sheet G are brought into a state of being partially separated from each other due to an adverse effect of the space X. In this state, when the widthwise edge portions Gb of the glass sheet G are nipped by the edge rollers 6 as illustrated in FIG. 13b, the separated portions are closed forcibly, with the result that a cavity Y is formed inside the closed portion. In this case, selvage portions (swelling portions) relatively thicker than the widthwise center portion Ga serving as a product portion are formed at both the widthwise edge portions Gb of the glass sheet G, which are nipped by the edge rollers 6, and hence the cavity Y is formed in each of the selvage portions or in the vicinity of each of the selvage portions. The cavity Y is hereinafter referred to also as "selvage portion cavity," and it is assumed that the selvage portion cavity Y may be formed continuously or intermittently along a longitudinal direction (up-and-down direction) of the glass sheet G.

When the selvage portion cavity Y is present, trouble is liable to occur when the glass sheet G drawn downward from the forming device 1 is to be cut. That is, as illustrated in FIG. 14, when the glass sheet G drawn downward from the forming device 1 is, for example, to be fractured along a scribe line extending along a chain line L of FIG. 14, a crack supposed to propagate along the scribe line may propagate inappropriately upward and/or downward along the selvage portion cavity Y as indicated by the arrows A and B of FIG. 14. Therefore, there is a risk in that the glass sheet G is damaged over a wide range. Particularly when the crack propagates upward via the selvage portion cavity Y as indicated by the arrow A, the glass sheet G may be affected in a region up to the vicinity of the forming device 1, resulting in serious trouble.

SUMMARY OF INVENTION

In view of the above-mentioned circumstances, it is a technical object of the present invention to reliably suppress, when forming a glass sheet by an overflow downdraw method, formation of spaces at both widthwise end portions of a forming device along with failure in fusion between a lower edge of the forming device and the glass sheet.

Solution to Problem

According to one embodiment of the present invention, which is devised to achieve the above-mentioned object, there is provided an apparatus for manufacturing a glass sheet, which is configured to form the glass sheet by fusing streams of molten glass together at a lower edge of a forming device having a substantially wedge shape while causing the streams of molten glass to flow downward along both outer surface portions of the forming device by an overflow downdraw method, the forming device comprising protruding pieces, each of which extends away from a guide wall portion in a width direction, extends downward below the lower edge of the forming device, the protruding pieces being arranged at least at both widthwise end portions of the lower edge of the forming device, the protruding pieces each having a distal end formed by a straight line substantially parallel to the lower edge of the forming device, and a flat plate portion extending vertically downward in a region up to the distal end. Each of the widthwise end portions extends in the width direction.

Note that, the description: "formed by a straight line substantially parallel to the lower edge of the forming device" herein encompasses not only a case where the distal end of each of the protruding pieces is formed by a straight line geometrically parallel to the lower edge of the forming device, but also a case where an angle formed between the distal end of each of the protruding pieces and the lower edge of the forming device is equal to or less than 5° (the same applies hereinafter).

According to this configuration, at least both the widthwise end portions of the lower edge of the forming device are extended downward by the protruding pieces. Therefore, even when both widthwise edge portions of the molten glass are to be released from the forming device earlier, the protruding pieces are present in a releasing direction of the molten glass, and thus the molten glass is guided to the distal end of each of the protruding pieces while being held in close contact with each of the protruding pieces. The distal end of each of the protruding pieces is formed by the straight line parallel to or substantially parallel to the lower edge of the forming device, and hence the molten glass flowing downward along the surface of each of the protruding pieces is separated from the distal end of each of the protruding pieces at substantially the same height and timing. Therefore, an inappropriate space is not easily formed between each of both the widthwise end portions of the forming device and the glass sheet to be formed. That is, it is possible to reliably suppress a situation where a cavity is formed inside each of both the widthwise edge portions of the glass sheet to be formed. Note that, in a case where the distal end of each of the protruding pieces is significantly inclined so as to form an angle together with the lower edge of the forming device (in a case where the angle formed therebetween is more than 5°), the height and timing at which the molten glass is separated from the distal end of each of the protruding pieces may fluctuate, and thus it is impossible to reliably prevent the formation of the space between the distal end of each of the protruding pieces and the glass sheet to be formed.

In the above-mentioned configuration, it is preferred that the distal end of each of the protruding pieces have a tapered shape that is more acute than the lower edge of the forming device.

The forming device is generally formed of refractory bricks of dense zircon or the like. When the lower edge of the forming device is acute, there is a risk in that the forming device is damaged at a point starting from chipping of the lower edge or the like. Therefore, as enlarged in FIG. 12, the lower edge of the forming device generally has a rounded shape without a corner. When the lower edge of the forming device is rounded as described above, however, the molten glass is liable to be released by the time the molten glass reaches the lower edge of the forming device. Therefore, when the distal end of each of the protruding pieces is formed into the tapered shape that is more acute than the lower edge of the forming device as described above, the molten glass can be guided to the distal end of each of the protruding pieces more reliably.

In the above-mentioned configuration, it is preferred that the each of the protruding pieces comprise a flat surface portion extending vertically downward in a region up to the distal end of the each of the protruding pieces.

With this configuration, the direction of the gravity acting on the molten glass matches with the direction of guiding the molten glass by each of the protruding pieces. Therefore, it is possible to more reliably prevent a situation where the molten glass is released in the middle of each of the protruding pieces.

In the above-mentioned configuration, the protruding pieces may be arranged only at both the widthwise end portions of the lower edge of the forming device, and a widthwise inner side end of the each of the protruding pieces may extend outward in a width direction as a distance from the lower edge of the forming device is increased in a downward direction, to thereby define a convex curved line smoothly continuous with the distal end of the each of the protruding pieces.

With this configuration, the protruding pieces can effectively be arranged only in the regions in which the effect of preventing the formation of the selvage portion cavity in the glass sheet is exerted. Further, the widthwise inner side end of each of the protruding pieces arranged at both the widthwise end portions defines the convex curved line smoothly continuous with the lower end, and hence the protruding piece has no such abrupt shape shifting portion as a bent portion (angulated portion). Therefore, it is possible to prevent a situation where the flow of the molten glass becomes non-uniform so that a streak is formed in the glass sheet in the up-and-down direction.

In the above-mentioned configuration, the protruding pieces may comprise a protruding piece arranged in an entire widthwise region of the lower edge of the forming device.

When the space is formed between a widthwise center portion of the lower edge of the forming device and the glass sheet, a volatile component may be precipitated from the molten glass into that space. The precipitation of the volatile component may cause adverse effects on the glass sheet to be formed. Therefore, as described above, the protruding piece may be arranged in the entire widthwise region of the lower edge of the forming device, to thereby prevent the formation of the space between the entire widthwise region and the glass sheet.

In the above-mentioned configuration, it is preferred that the apparatus for manufacturing a glass sheet further comprise pairs of edge rollers arranged at positions immediately below the forming device, for nipping both widthwise edge portions of the glass sheet from both front and back sides of the glass sheet, and that a width dimension of the distal end of the each of the protruding pieces be larger than a width dimension of a nip region of each of the pairs of edge rollers, in which the glass sheet is to be nipped. The "nip region" herein refers to a region of the edge rollers, which is actually in contact with the glass sheet.

With this configuration, the distal end of each of the protruding pieces reliably overlaps with the nip region of the edge rollers, which may also be preferred from the viewpoint of preventing the formation of the cavity in the glass sheet.

According to one embodiment of the present invention, which is devised to achieve the above-mentioned object, there is provided a method of manufacturing a glass sheet, the method comprising forming the glass sheet by fusing streams of molten glass together at a lower edge of a forming device having a substantially wedge shape while causing the streams of molten glass to flow downward along both outer surface portions of the forming device by an overflow downdraw method, the streams of molten glass being caused to flow downward under a state in which protruding pieces, which protrude downward from the lower edge of the forming device, and have distal ends each formed by a straight line substantially parallel to the lower edge of the forming device, are arranged at least at both widthwise end portions of the lower edge of the forming device.

According to this configuration, it is possible to attain actions and effects similar to those in the corresponding configuration described above.

Advantageous Effects of Invention

As described above, according to one embodiment of the present invention, the protruding pieces arranged at least at both the widthwise end portions of the lower edge of the forming device can reliably suppress a situation where the space is formed between each widthwise end portion of the forming device and the glass sheet to be formed.

DESCRIPTION OF EMBODIMENTS

Now, embodiments of the present invention are described with reference to the accompanying drawings. Note that, components corresponding to those described in the "Background Art" section are described with the same reference symbols. Further, in the embodiments of the present invention, detailed description of matters in common with the preceding embodiment is omitted in the succeeding embodiment.

First Embodiment

Figure 1:
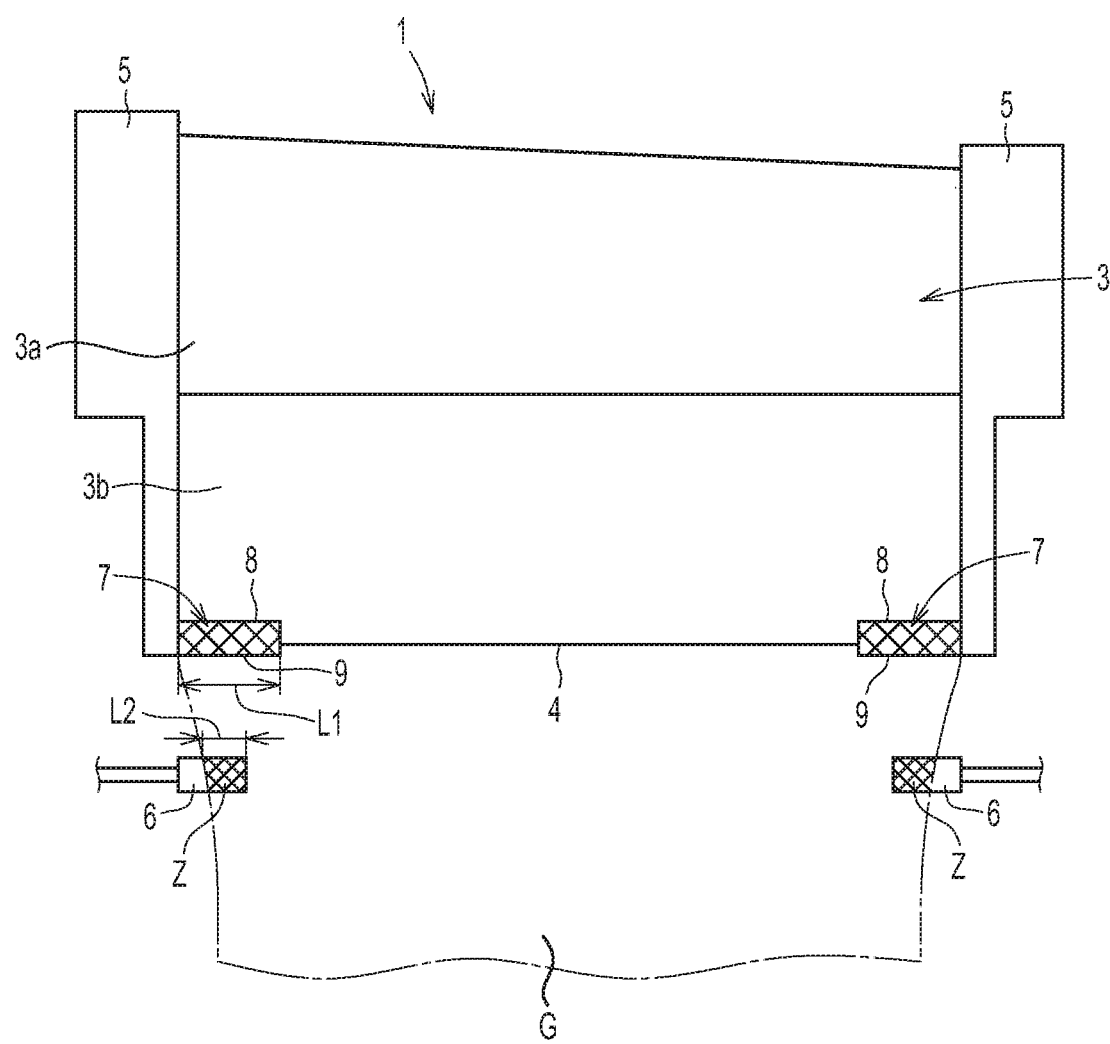
FIG. 1 is a front view illustrating the periphery of a forming device of an apparatus for manufacturing a glass sheet according to a first embodiment of the present invention.

FIG. 1 is a front view illustrating a main part of an apparatus for manufacturing a glass sheet according to a first embodiment of the present invention. As illustrated in FIG. 1, the apparatus for manufacturing a glass sheet comprises a forming device 1 for executing an overflow downdraw method.

The forming device 1 is elongated along a direction corresponding to a width direction of a glass sheet G to be formed, and comprises an overflow trough 2 formed in a top portion of the forming device 1 along a longitudinal direction thereof, a pair of outer surface portions 3 gradually approaching each other downward to have a substantially wedge shape, and guide wall portions 5 formed on both widthwise end portions of the outer surface portions 3.

The outer surface portions 3 each comprise a perpendicular surface portion 3a and an inclined surface portion 3b, which are continuously connected to each other in an up-and-down direction. An intersection between the respective inclined surface portions 3b serves as a lower edge 4 of the forming device 1. Note that, the shape of each of the outer surface portions 3 is not particularly limited as long as the outer surface portions 3 converge at the lower edge 4 in cross section, and may be, for example, a shape comprising only an inclined surface without any perpendicular surface, or a shape partially or entirely comprising a curved surface.

The guide wall portions 5 serve to guide both widthwise edge portions of molten glass Gm, which flows downward along the outer surface portions 3 of the forming device 1, downward along the surfaces of the forming device 1. The thickness of each guide wall portion 5 (height from the surface of each outer surface portion 3 of the forming device 1) is, for example, 1 mm to 10 mm.

The forming device 1 is formed of refractory bricks of dense zircon or the like, and the lower edge 4 is rounded.

Further, as a feature in the configuration of this embodiment, protruding pieces 7, which protrude downward from the lower edge 4 of the forming device 1, are arranged at both widthwise end portions of the lower edge 4 of the forming device 1, respectively.

Figure 2:
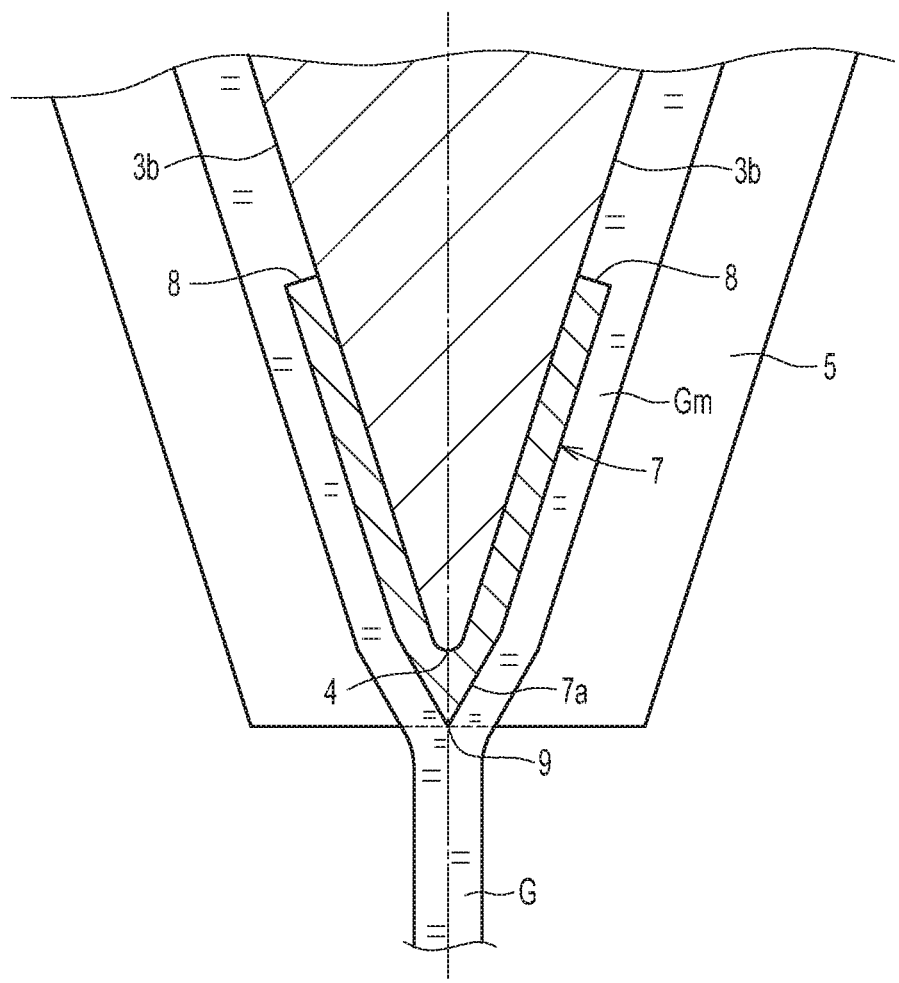
FIG. 2 is an enlarged vertical sectional view illustrating a lower edge portion of the forming device of FIG. 1.

Specifically, as illustrated in FIG. 2, each protruding piece 7 is arranged so as to cover a partial region including the lower edge 4 of the forming device 1. That is, the protruding piece 7 has a substantially V-shape conforming to both the inclined surface portions 3b of the forming device 1, and comprises an acute portion 7a being formed at least below the lower edge 4 of the forming device 1 and having a tapered shape that is more acute than the lower edge 4 of the forming device 1. Further, a proximal end (upper end) 8 and a distal end (lower end) 9 of the protruding piece 7 are each formed by a straight line (horizontal straight line) parallel to the lower edge 4 of the forming device 1. The distal end 9 of the protruding piece 7, that is, the distal end of the acute portion 7a is positioned on the same perpendicular plane as the lower edge 4 of the forming device 1. Note that, the description is given of the case where the acute portion 7a having an acute inclination angle in the middle is formed on the protruding piece 7, but the protruding piece 7 may have such a shape that the surfaces of the protruding piece 7 converge at the distal end 9 with a constant angle maintained in conformity with the inclined surface portions 3b of the forming device 1 (the same applies to the other embodiments described later).

Further, as illustrated in FIG. 1, a width dimension L1 of the distal end 9 of the protruding piece 7 is larger than a width dimension L2 of a nip region Z of edge rollers 6, in which the glass sheet G is to be nipped (when the width dimension of the nip region Z fluctuates, the maximum width dimension of the nip region Z). Note that, the cross hatching regions of FIG. 1 schematically indicate regions of the protruding pieces 7 and the edge rollers 6, which are brought into contact with the molten glass Gm or the glass sheet G (the same applies to FIGS. 3 and 5 referred to later). Further, the width dimension L1 is larger than the width dimension L2, but the width dimension L1 may be equal to the width dimension L2, or may be smaller than the width dimension L2.

The protruding piece 7 is made of metals (noble metals) having heat resistance and corrosion resistance, an alloy of those metals, or a composite material of those metals. Specifically, for example, the protruding piece 7 is made of platinum, a platinum alloy, or a ceramic-dispersed composite material.

Further, the protruding piece 7 is fixed to the guide wall portion 5 and the inclined surface portion 3b by, for example, welding.

Next, description is given of a method of manufacturing a glass sheet through use of the apparatus for manufacturing a glass sheet, which is constructed as described above.

As illustrated in FIG. 1, the molten glass Gm is first fed into the overflow trough 2 through a feed pipe (not shown), and the molten glass Gm is caused to overflow from the overflow trough 2 to both sides of the forming device 1. Streams of the molten glass Gm, which have overflowed to both sides of the forming device 1, flow downward along both the outer surface portions 3 while both the widthwise edge portions are guided downward by the guide wall portions 5. At this time, both the widthwise edge portions of the molten glass Gm override the surfaces of the protruding pieces 7 at the proximal ends 8 thereof, and are therefore guided along the surfaces of the protruding pieces 7 to positions below the lower edge 4 of the forming device 1. That is, streams of the molten glass Gm at the widthwise center portion are fused together at the lower edge 4 of the forming device 1, whereas streams of the molten glass Gm at each widthwise edge portion are fused together at the distal end 9 of each protruding piece 7. Then, a single glass sheet G is continuously formed of the streams of the molten glass Gm fused together at the lower edge 4 of the forming device 1 and the streams of the molten glass Gm fused together at the distal ends 9 of the protruding pieces 7.

Figure 12:
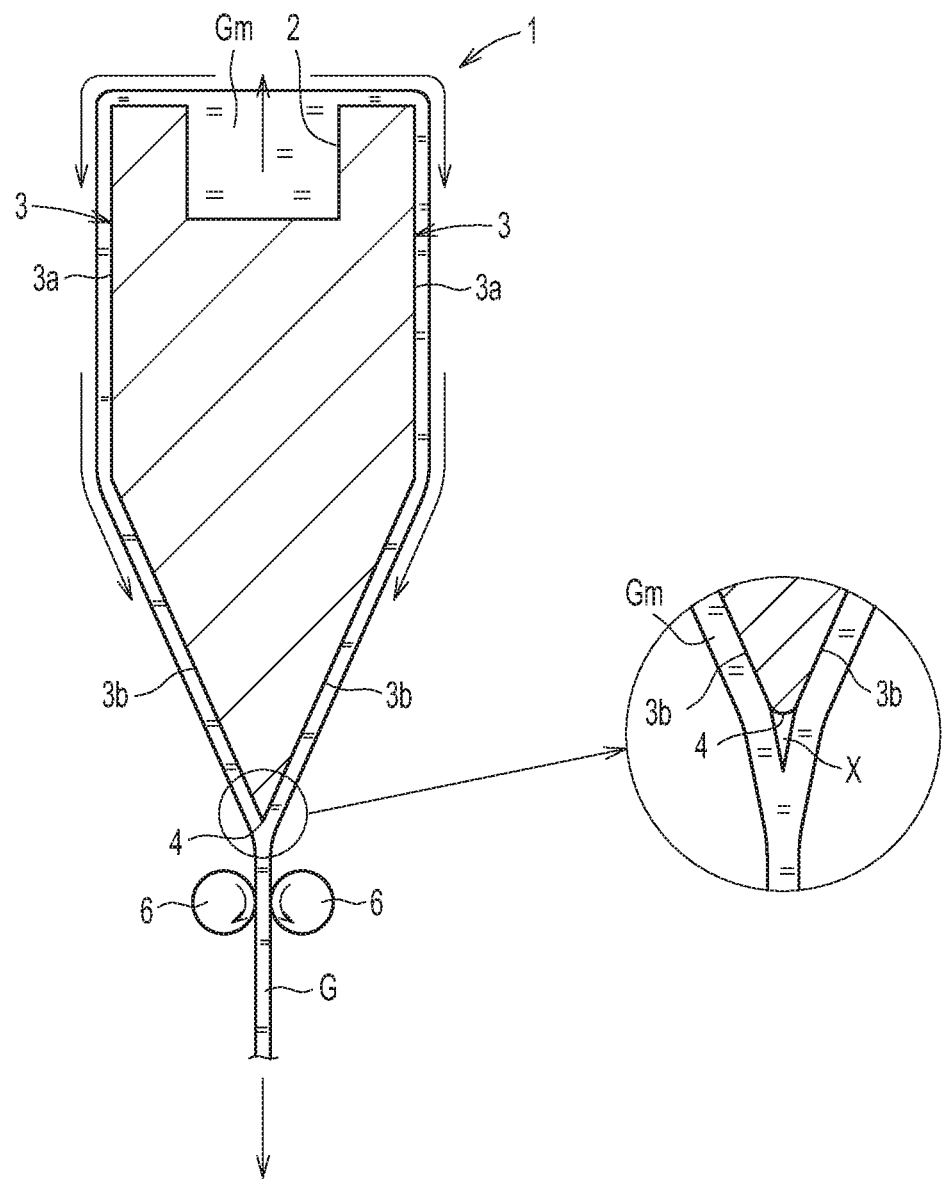
FIG. 12 is an explanatory view illustrating a problem inherent in the related-art apparatus for manufacturing a glass sheet.
Figure 13A:
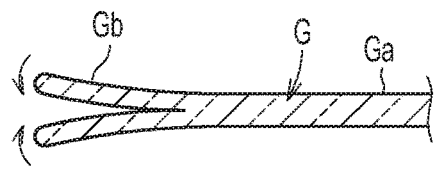
FIG. 13a is an explanatory view illustrating the problem inherent in the related-art apparatus for manufacturing a glass sheet, specifically, illustrating a situation at a widthwise edge portion of a glass sheet within a range of from a lower edge of the forming device to edge rollers.
Figure 13B:
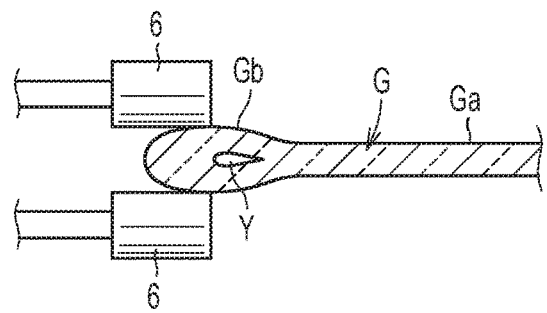
FIG. 13b is an explanatory view illustrating the problem inherent in the related-art apparatus for manufacturing a glass sheet, specifically, illustrating a situation at the widthwise edge portion of the glass sheet, which has reached the edge rollers.
Figure 14:
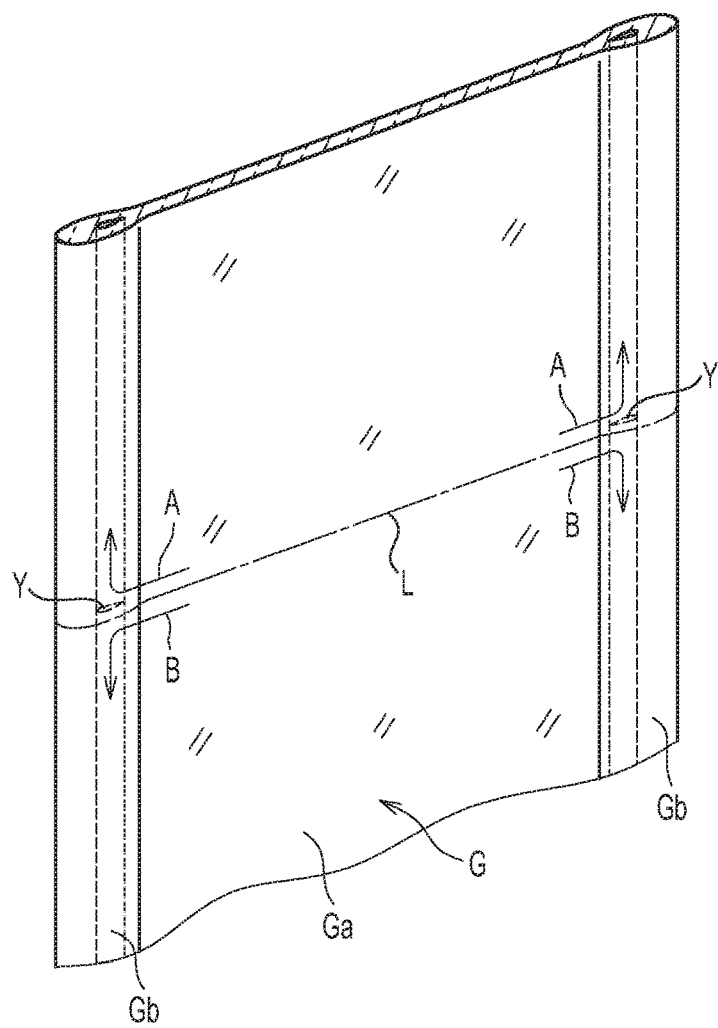
FIG. 14 is an explanatory view illustrating the problem inherent in the related-art apparatus for manufacturing a glass sheet.

At this time, both the widthwise end portions of the lower edge 4 of the forming device 1 are extended downward by the protruding pieces 7. Therefore, even when both the widthwise edge portions of the molten glass Gm are to be released from the forming device 1 by the time the molten glass Gm reaches the lower edge 4 of the forming device 1, the protruding pieces 7 are present in a releasing direction of the molten glass Gm. In other words, the protruding pieces 7 fill a space (space X of FIG. 12) that may be formed between the lower edge 4 of the forming device 1 and the glass sheet G in a case where the protruding pieces 7 are not present. As a result, the molten glass Gm is guided to the distal ends 9 of the protruding pieces 7 while being held in close contact with the surfaces of the protruding pieces 7.

Further, the distal ends 9 of the protruding pieces 7 are each formed by the straight line parallel to the lower edge 4 of the forming device 1, and hence the molten glass Gm guided to the distal ends 9 of the protruding pieces 7 is separated from the distal ends 9 of the protruding pieces 7 at substantially the same height (position) and timing. Therefore, an inappropriate space is not easily formed between each widthwise end portion of the forming device 1 and the glass sheet G. That is, the formation of a selvage portion cavity can reliably be prevented at each widthwise edge portion of the glass sheet G.

Further, the width dimension L1 of the distal end 9 of the protruding piece 7 is set larger than the width dimension L2 of the nip region Z of the edge rollers 6, and hence the distal end 9 of the protruding piece 7 reliably overlaps with the nip region Z of the edge rollers 6. In other words, the glass sheet G that has reached the nip region Z of the edge rollers 6 all corresponds to the glass sheet G formed at the distal end 9 of the protruding piece 7. Therefore, the widthwise edge portions of the respective pieces of the glass sheet G are reliably fused together by the time the glass sheet G reaches the edge rollers 6, thereby further enhancing the effect of suppressing the formation of the selvage portion cavity. In addition, when the formation of the selvage portion cavity is suppressed as described above, there is no need to enlarge the nip region Z of the edge rollers 6 more than necessary, thereby being capable of limiting the nip region Z to a minimum range that can restrict the contraction of the glass sheet G in the width direction. That is, when the nip region Z of the edge rollers 6 is to be enlarged, it is necessary to shift the edge rollers 6 inward in the width direction, resulting in a smaller width of a product portion of the glass sheet G to be formed. Thus, the advantage in that the nip region Z of the edge rollers 6 can be limited to the minimum necessary range as described above also leads to increase in width of the product portion of the glass sheet G to be formed.

Second Embodiment

Figure 3:
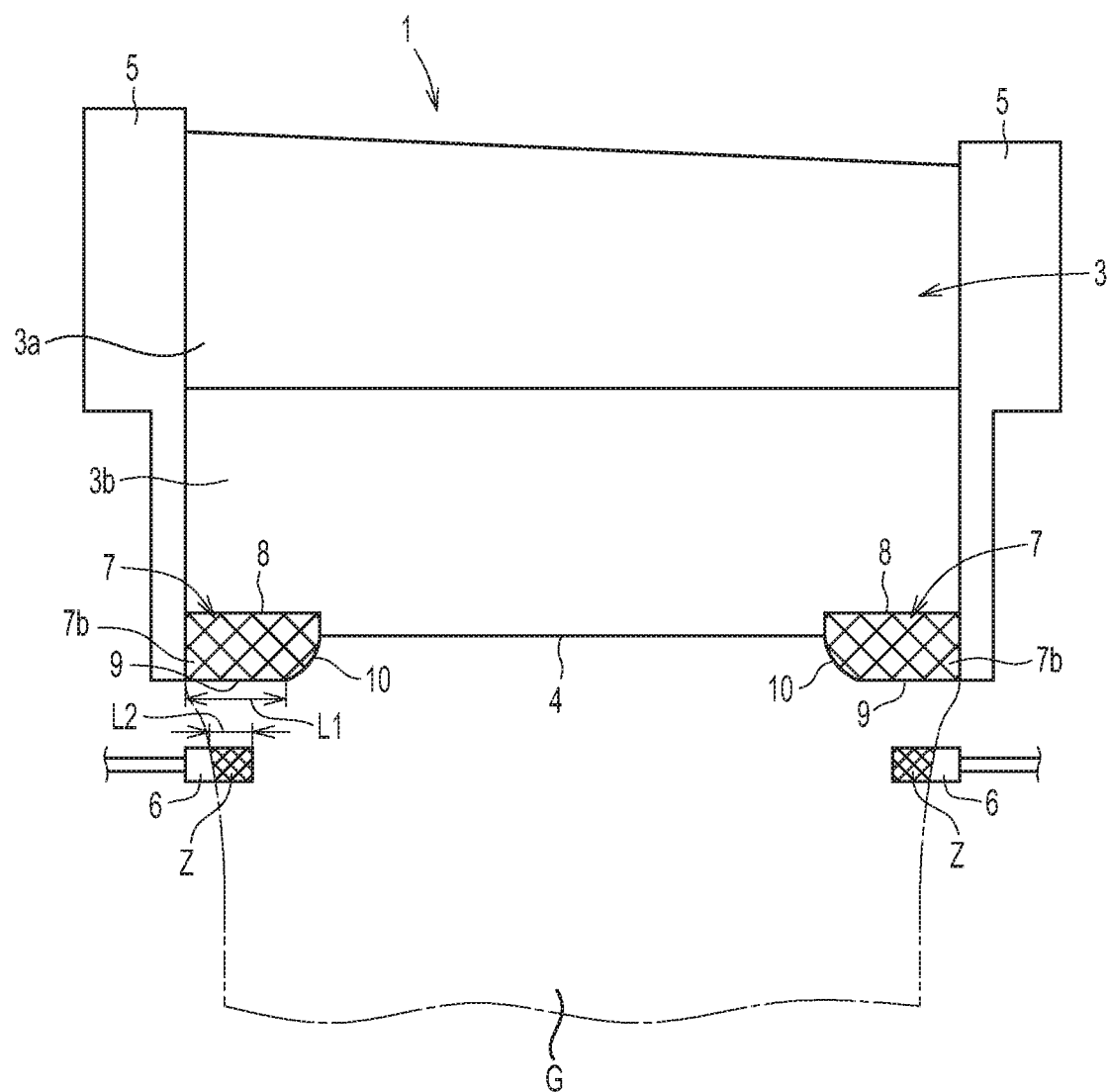
FIG. 3 is a front view illustrating the periphery of a forming device of an apparatus for manufacturing a glass sheet according to a second embodiment of the present invention.

FIG. 3 is a front view illustrating a main part of an apparatus for manufacturing a glass sheet according to a second embodiment of the present invention. The apparatus for manufacturing a glass sheet according to the second embodiment is different from the apparatus for manufacturing a glass sheet according to the first embodiment in the structure of the protruding piece 7.

Figure 4:
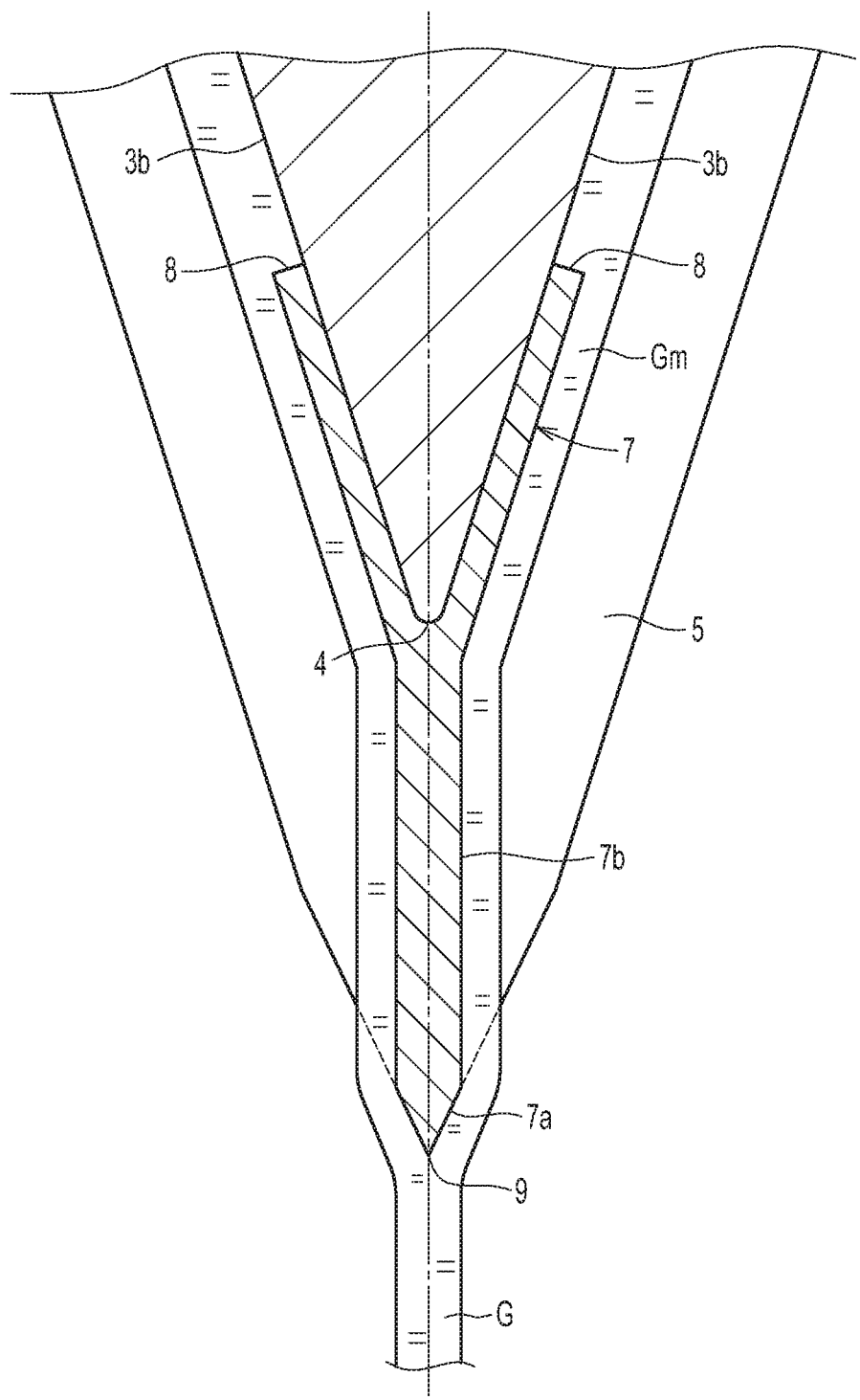
FIG. 4 is an enlarged vertical sectional view illustrating a lower edge portion of the forming device of FIG. 3.

That is, as illustrated in FIG. 3, in the second embodiment, the protruding piece 7 comprises a flat surface portion 7b extending vertically downward. As illustrated in FIG. 4, the flat surface portion 7b extends vertically downward from the lower edge 4 of the forming device 1 or the vicinity of the lower edge 4, and has a shape continuous with the acute portion 7a at a position below the flat surface portion 7b.

Further, in this embodiment, as illustrated in FIG. 3, a side end 10 of the protruding piece 7 (specifically, a side end of the flat surface portion 7b), which is positioned close to the widthwise center of the forming device 1, extends outward in the width direction (toward the guide wall portion 5) as the distance from the lower edge 4 of the forming device 1 is increased in the downward direction, to thereby define a convex curved line smoothly continuous with the distal end 9 of the protruding piece 7.

With this configuration, the direction of the gravity acting on the molten glass Gm matches with the direction of guiding the molten glass Gm by the flat surface portion 7b of the protruding piece 7. Therefore, it is possible to more reliably prevent a situation where the molten glass Gm is released in the middle of the protruding piece 7. Further, the side end 10 of the flat surface portion 7b of the protruding piece 7 defines the convex curved line smoothly continuous with the distal end 9 of the protruding piece 7, and has no such abrupt shape shifting portion as a bent portion (angulated portion). Therefore, unlike the case where the abrupt shape shifting portion is present, it is possible to prevent a situation where the flow of the molten glass Gm becomes non-uniform so that a streak is formed in the glass sheet G in the up-and-down direction at a position corresponding to the shape shifting portion.

Third Embodiment

Figure 5:
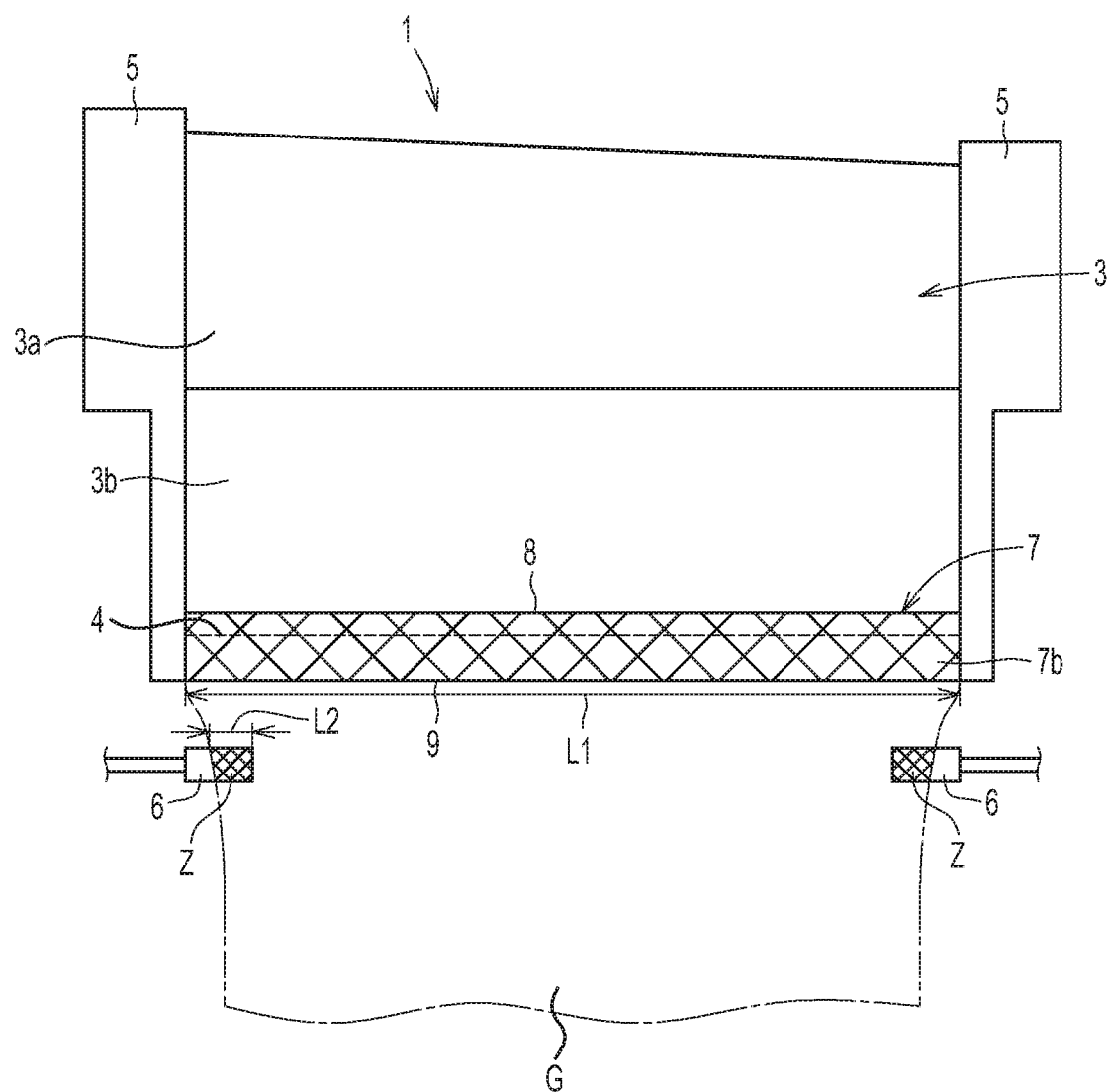
FIG. 5 is a front view illustrating the periphery of a forming device of an apparatus for manufacturing a glass sheet according to a third embodiment of the present invention.

FIG. 5 is a front view illustrating a main part of an apparatus for manufacturing a glass sheet according to a third embodiment of the present invention. The apparatus for manufacturing a glass sheet according to the third embodiment is different from the apparatus for manufacturing a glass sheet according to the second embodiment in that the protruding piece 7 is arranged in the entire widthwise region instead of being arranged only at both the widthwise end portions of the forming device 1. Note that, the vertical cross section of the protruding piece 7 is similar to that of FIG. 4.

When the space is formed between the lower edge 4 of the forming device 1 and the glass sheet G (see FIG. 12), a volatile component may be precipitated from the molten glass Gm onto a part of the lower edge 4 of the forming device 1 corresponding to that space. The precipitation of the volatile component may cause such adverse effects that the volatile component disturbs the flow of the molten glass to generate inappropriate waviness in the glass sheet to be formed, and that foreign matter derived from the volatile component is contained in the glass sheet. In particular, the widthwise center portion of the glass sheet G is utilized as a product, and hence it is desired to minimize the generation of inappropriate waviness and the containment of foreign matter. Therefore, as described above, it is preferred to arrange the protruding piece 7 over the entire region of the lower edge 4 of the forming device 1, to thereby prevent the formation of the space between the entire widthwise region of the lower edge 4 of the forming device 1 and the glass sheet G.

Note that, the protruding piece 7 having the sectional shape described in the first embodiment (see FIG. 2) may be arranged in the entire region of the lower edge 4 of the forming device 1.

Fourth Embodiment

Figure 6:
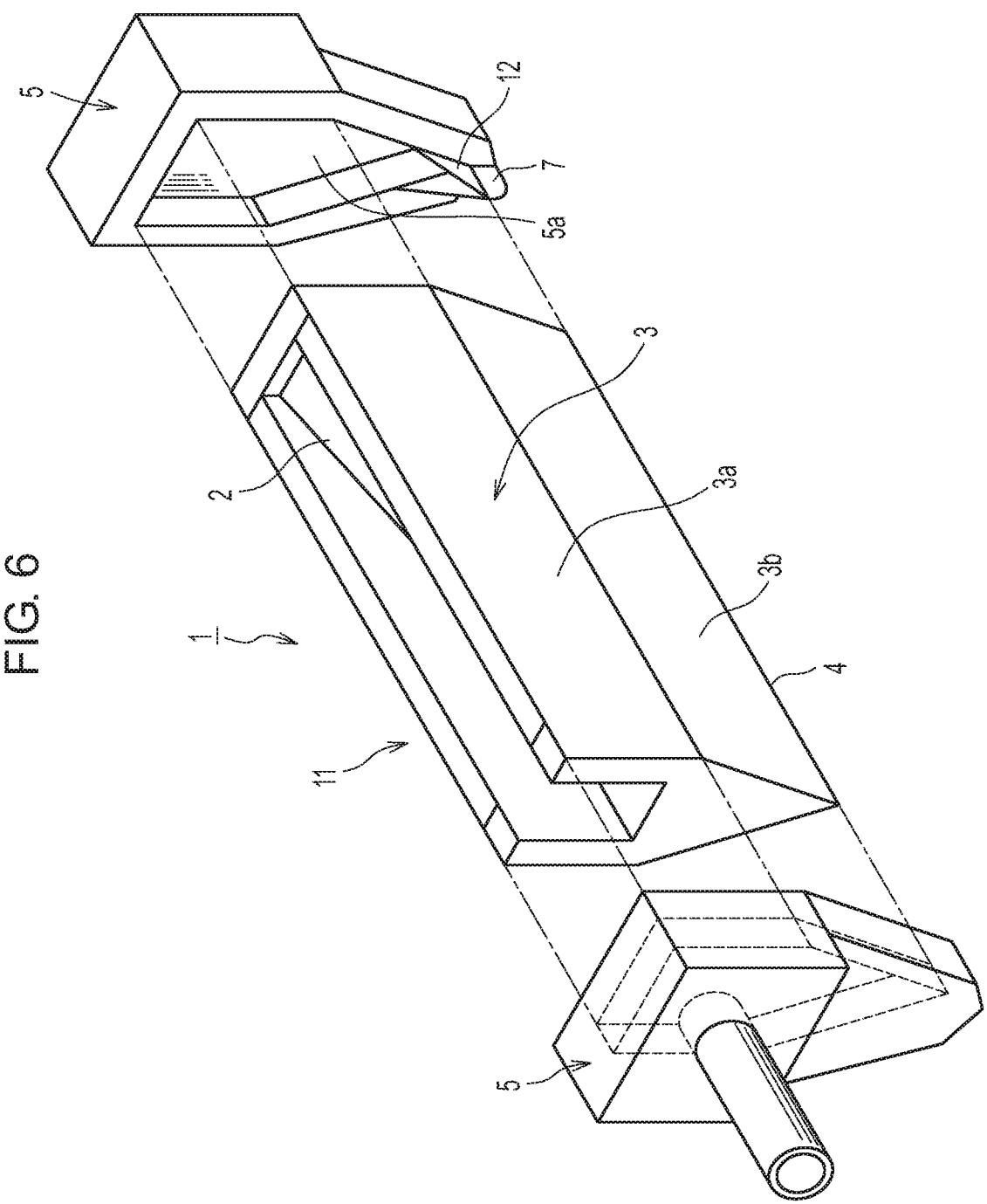
FIG. 6 is an exploded perspective view illustrating arrangement of components of a forming device to be used in an apparatus for manufacturing a glass sheet according to a fourth embodiment of the present invention.

FIG. 6 is an exploded perspective view illustrating arrangement of components of a forming device to be used in an apparatus for manufacturing a glass sheet according to a fourth embodiment of the present invention. In the fourth embodiment, the forming device 1 is structured so that the guide wall portion 5 having a fitting recess 5a is externally fitted and fixed onto each widthwise end portion of a forming device main body 11, which comprises the overflow trough 2, the outer surface portions 3, and the like. Note that, the above-mentioned structure for mounting the guide wall portion 5 may also be employed in the first to third embodiments.

The guide wall portion 5 comprises a covering portion 12, which protrudes toward the widthwise center while covering a lower region including the lower edge 4 of the forming device main body 11.

Figure 7:
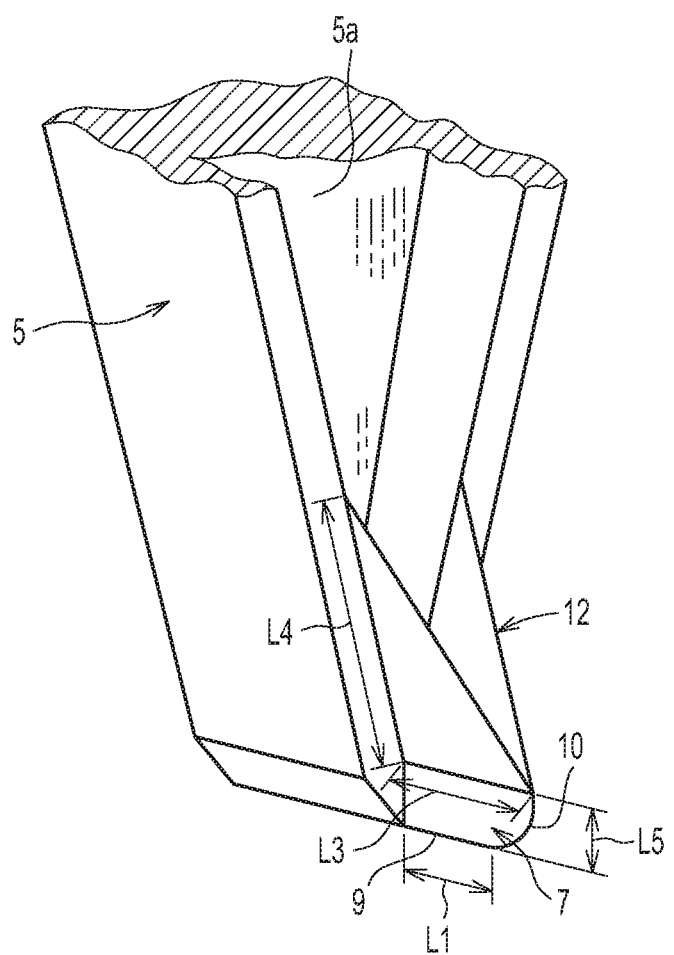
FIG. 7 is an enlarged perspective view illustrating the periphery of a lower edge portion of a guide wall portion of FIG. 6.

Specifically, as illustrated in FIG. 7, the covering portion 12 is formed of a thin plate member along the outer surface portions 3 of the forming device main body 11. The thickness of the covering portion 12 is smaller than the thickness of the guide wall portion 5, and is, for example, 0.5 mm to 3.0 mm.

Further, the covering portion 12 is shaped so that the amount of protrusion toward the widthwise center of the forming device main body 11 is gradually increased as the distance to the lower side of the forming device main body 11 is decreased. Specifically, in this embodiment, the distal end portion of the covering portion 12 in the protruding direction forms an inclined straight line.

The covering portion 12 is made of metals (noble metals) having heat resistance and corrosion resistance, an alloy of those metals, or a composite material of those metals. Specifically, for example, the covering portion 12 is made of platinum, a platinum alloy, or a ceramics-dispersed composite material.

Figure 8:
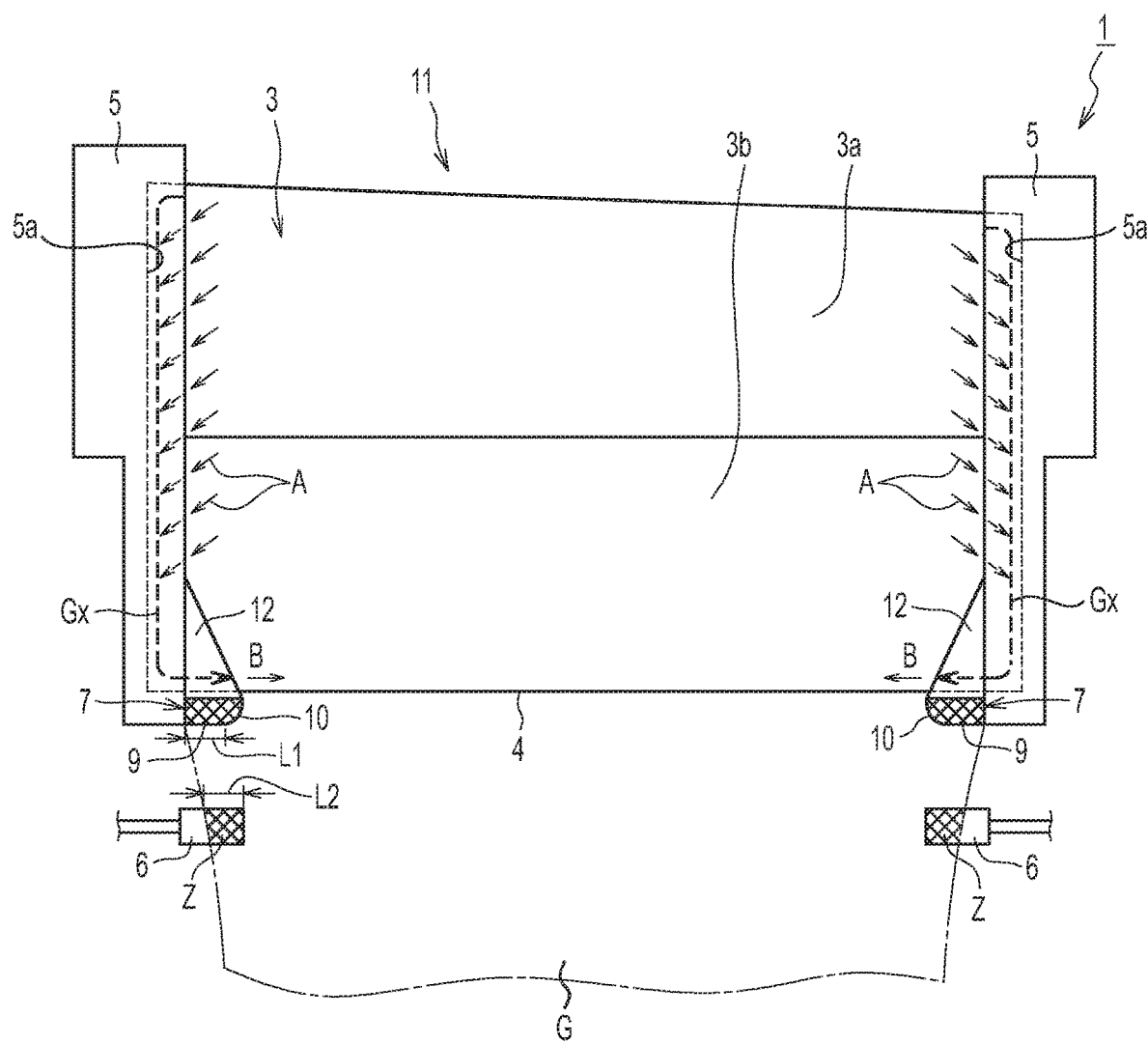
FIG. 8 is a front view illustrating the periphery of the forming device of the apparatus for manufacturing a glass sheet according to the fourth embodiment.

Further, as illustrated in FIG. 8, the covering portion 12 serves like a gutter for discharging molten glass Gx, which has entered a gap between the forming device main body 11 and the guide wall portion 5 along the arrows A of FIG. 8, to the outside (toward the widthwise center of the forming device main body 11) as indicated by the arrow B of FIG. 8 at a position at which the molten glass Gx rejoins with the molten glass Gm flowing downward normally along the outer surface portions 3 of the forming device main body 11. Note that, the molten glass Gm flowing downward normally along the outer surface portions 3 of the forming device main body 11 overrides the outer surface of the covering portion 12.

Figure 9:
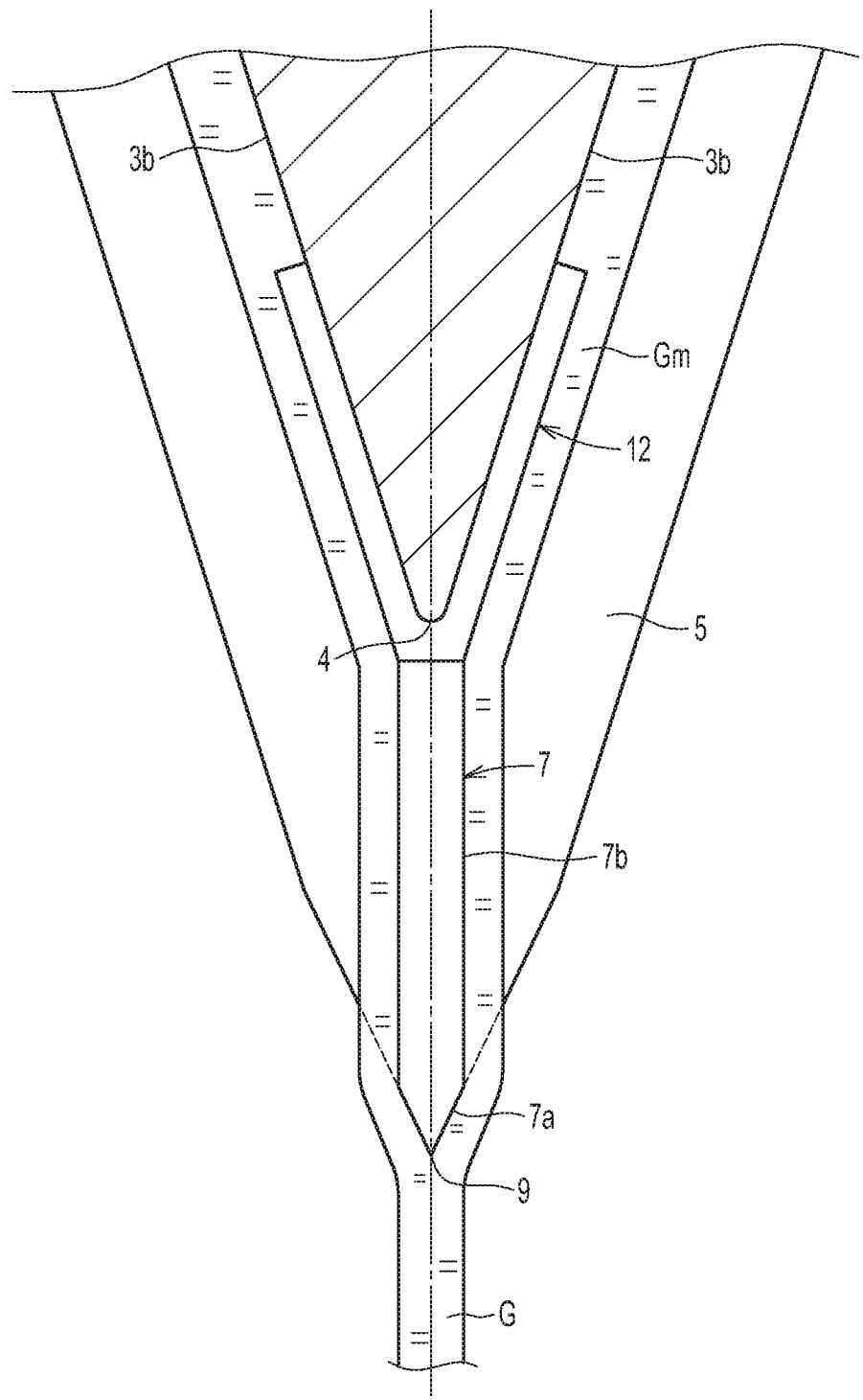
FIG. 9 is an enlarged vertical sectional view illustrating a lower edge portion of the forming device of FIG. 8.

The protruding piece 7 is arranged at a lower end of the covering portion 12 structured as described above. In this embodiment, as illustrated in FIG. 9, the protruding piece 7 comprises the flat surface portion 7b extending vertically downward, and is shaped so that the acute portion 7a is continuous with a lower end portion of the flat surface portion 7b.

Further, the side end 10 of the protruding piece 7 (specifically, the side end of the flat surface portion 7b), which is positioned close to the widthwise center of the forming device main body 11, extends toward the widthwise end portion of the forming device main body 11 (toward the guide wall portion 5) as the distance to the lower side of the protruding piece 7 is decreased, to thereby define a convex curved line smoothly continuous with the distal end 9 of the protruding piece 7.

In this case, as examples of the covering portion 12 and the protruding piece 7, for example, the following examples are given. That is, as illustrated in FIG. 7, a width dimension L3 of the lower end of the covering portion 12 is 75 mm, and a height dimension L4 of the covering portion 12 is 150 mm. Further, the width dimension L1 of the distal end 9 of the protruding piece 7 parallel to the lower edge of the forming device main body 11 is 50 mm, and a height dimension L5 of the protruding piece 7 is 30 mm. A width dimension L6 of the proximal end 8 of the protruding piece 7 is substantially equal to the width dimension L3 of the lower end of the covering portion 12.

Figure 10A:
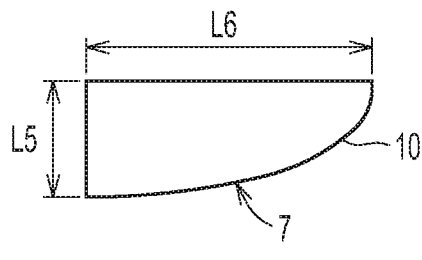
FIG. 10a is a front view illustrating a modification example of a protruding piece arranged at a lower end of a covering portion.
Figure 10B:
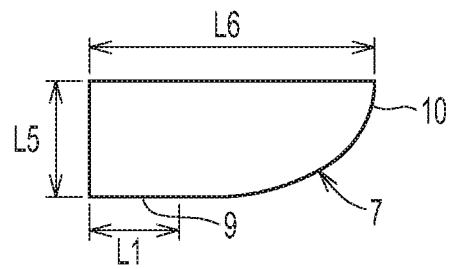
FIG. 10b is a front view illustrating a modification example of the protruding piece arranged at the lower end of the covering portion.

Note that, various shapes as illustrated in, for example, FIGS. 10a to 10h may be employed as the shape of the protruding piece 7 arranged at the lower end of the covering portion 12 as described above. That is, as illustrated in FIGS. 10a and 10b, the curvature of the side end 10 of the protruding piece 7 may be changed so that the width dimension L1 of the distal end 9 of the protruding piece 7 parallel to the lower edge 4 of the forming device main body 11 is set smaller or to zero.

Figure 10C:
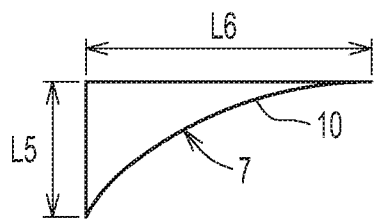
FIG. 10c is a front view illustrating a modification example of the protruding piece arranged at the lower end of the covering portion.
Figure 10D:
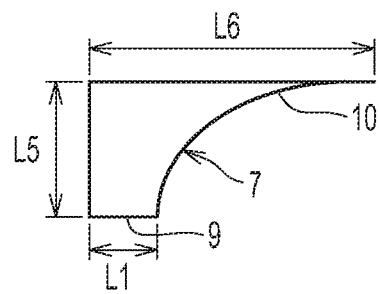
FIG. 10d is a front view illustrating a modification example of the protruding piece arranged at the lower end of the covering portion.
Figure 10E:
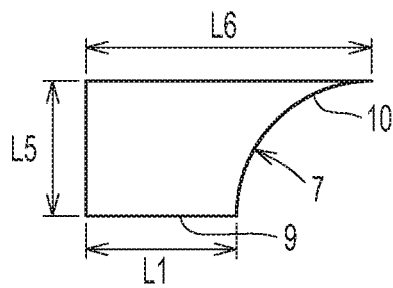
FIG. 10e is a front view illustrating a modification example of the protruding piece arranged at the lower end of the covering portion.

Further, as illustrated in FIGS. 10c to 10e, the side end 10 of the protruding piece 7 may be formed by a concave curved line, which is recessed inward. Also in this case, the curvature of the side end 10 of the protruding piece 7 may be changed so that the width dimension L1 of the distal end 9 of the protruding piece 7 parallel to the lower edge 4 of the forming device main body 11 is set smaller or to zero.

Figure 10F:
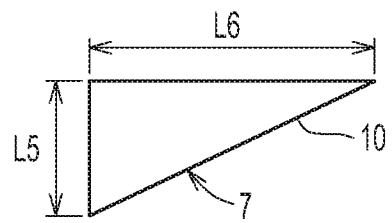
FIG. 10f is a front view illustrating a modification example of the protruding piece arranged at the lower end of the covering portion.
Figure 10G:
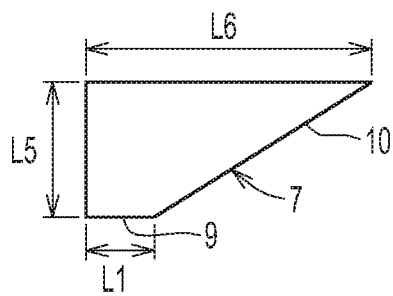
FIG. 10g is a front view illustrating a modification example of the protruding piece arranged at the lower end of the covering portion.
Figure 10H:
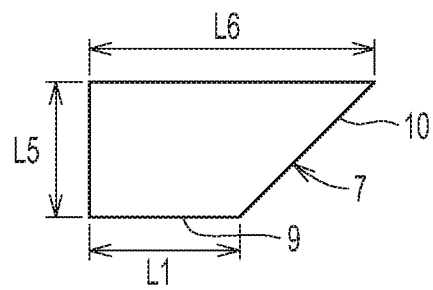
FIG. 10h is a front view illustrating a modification example of the protruding piece arranged at the lower end of the covering portion.
Figure 11:
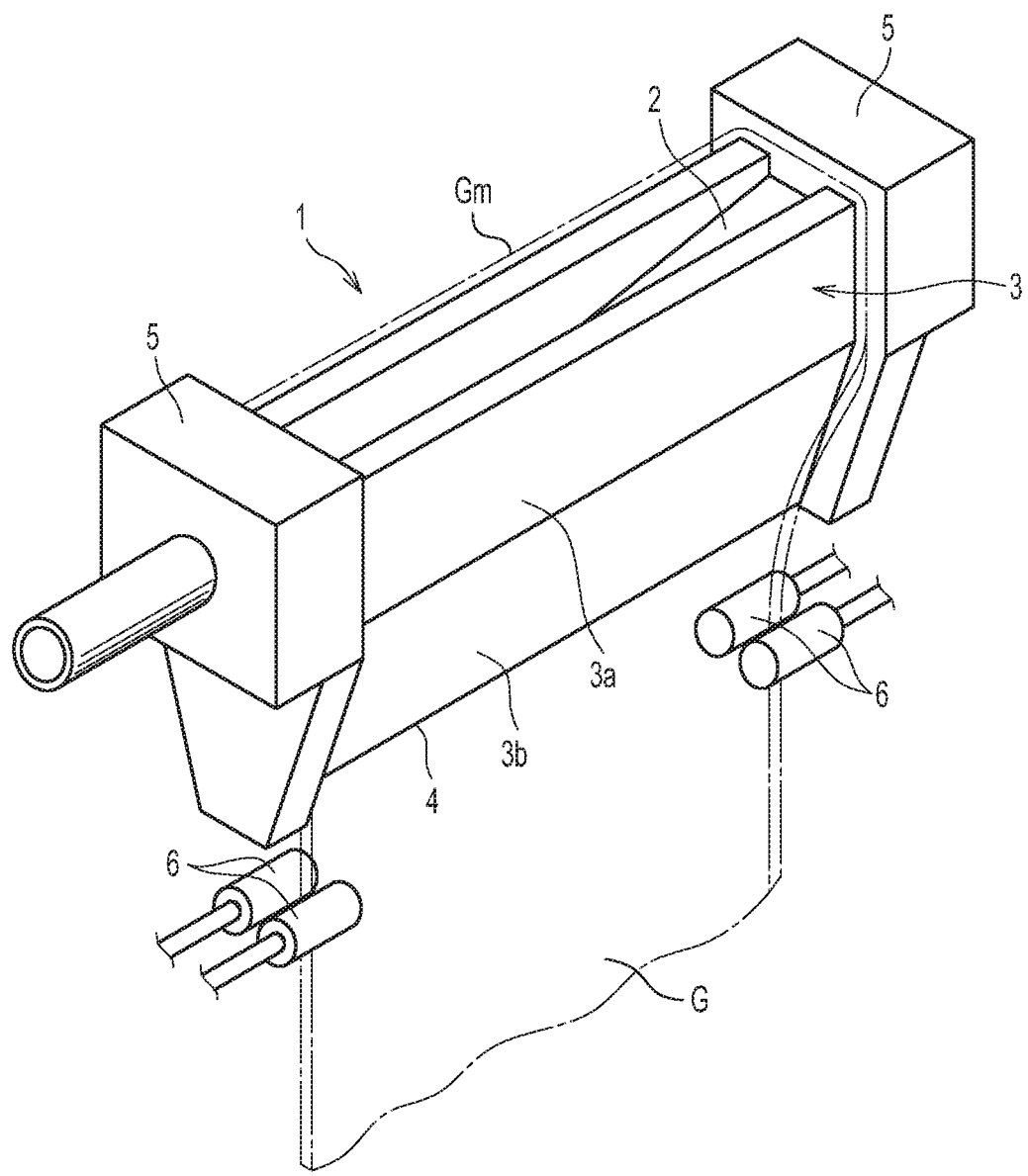
FIG. 11 is a perspective view illustrating the periphery of a forming device of a related-art apparatus for manufacturing a glass sheet.

Still further, as illustrated in FIGS. 10f to 10h, the side end 10 of the protruding piece 7 may be formed by a straight line. Also in this case, the inclination of the side end 10 of the protruding piece 7 may be changed so that the width dimension L1 of the distal end 9 of the protruding piece 7 parallel to the lower edge 4 of the forming device main body 11 is set smaller or to zero.

Note that, the protruding piece 7 serves to guide the molten glass Gm vertically downward, and hence it is preferred that the area of the protruding piece 7 capable of guiding the molten glass Gm be larger. Therefore, it is preferred that the side end 10 of the protruding piece 7 be defined by a straight line or a convex curved line.

As examples of various dimensions of the protruding pieces 7 of FIGS. 10a to 10h, the following examples are given. Note that, the dimensions of the covering portion 12 are similar to those of the above-mentioned examples (L3=75 mm and L4=150 mm).

In FIG. 10a, the dimensions (L1, L6, L5)=(0 mm, 75 mm, 30 mm),

In FIG. 10b, the dimensions (L1, L6, L5)=(25 mm, 75 mm, 30 mm),

In FIG. 10c, the dimensions (L1, L6, L5)=(0 mm, 75 mm, 30 mm),

In FIG. 10d, the dimensions (L1, L6, L5)=(25 mm, 75 mm, 30 mm),

In FIG. 10e, the dimensions (L1, L6, L5)=(50 mm, 75 mm, 30 mm),

In FIG. 10f, the dimensions (L1, L6, L5)=(0 mm, 5 mm, 30 mm), In FIG. 10g, the dimensions (L1, L6, L5)=(25 mm, 75 mm, 30 mm), and In FIG. 10h, the dimensions (L1, L6, L5)=(50 mm, 75 mm, 30 mm).

Note that, the description is given of the case where the width dimension L6 of the upper end of the protruding piece 7 is equal to the width dimension L3 of the lower end of the covering portion 12, but the width of the upper end of the protruding piece 7 may be larger or smaller than the width of the lower end of the covering portion 12. Further, in the case where the width of the upper end of the protruding piece 7 is larger than the width of the lower end of the covering portion 12, a single protruding piece 7 elongated in the width direction may be arranged so as to be bridged between the covering portions 12 arranged on the guide wall portions 5 on both sides. In addition, the shapes of the protruding pieces 7 illustrated in FIGS. 10a to 10h may be employed in the embodiments in which the covering portions 12 are not arranged.

REFERENCE SIGNS LIST 1 forming device
2 overflow trough
3 outer surface portion
3a perpendicular surface portion
3b inclined surface portion
4 lower edge of forming device
5 guide wall portion
6 edge roller
7 protruding piece
7a acute portion
7b flat surface portion
8 proximal end of protruding piece
9 distal end of protruding piece
10 side end of protruding piece
G glass sheet
Gm molten glass
X space formed between lower edge of forming device and glass sheet
Y selvage portion cavity

The invention claimed is:

1. A method of manufacturing a glass sheet, the method comprising:
  causing streams of molten glass to flow downward along each of a plurality of outer surface portions of a forming device, the plurality of outer surface portions of the forming device converging at a bottom edge of the forming device; and
  fusing the streams of molten glass together at the bottom edge of the forming device to form the glass sheet;
  wherein the forming device comprises at least one wall portion positioned so as to guide a widthwise end portion of one of the streams of molten glass, and at least one protruding piece which is contiguous with the at least one wall portion,
  wherein the at least one protruding piece is positioned so as to guide a portion of the one of the streams of molten glass vertically downward along a surface thereof to a position below the bottom edge of the forming device,
  wherein the at least one protruding piece extends away from the at least one wall portion in a first width direction or a second width direction opposite to the first width direction, extends downward below the bottom edge of the forming device, and is arranged at least at one of a plurality of widthwise end portions of the bottom edge of the forming device,
  wherein a first of the plurality of widthwise end portions of the bottom edge of the forming device extends in the first width direction and a second of the plurality of widthwise end portions of the bottom edge of the forming device extends in the second width direction, wherein the at least one protruding piece comprises a distal end which extends in a straight line substantially parallel to the bottom edge of the forming device, and an acute portion which extends vertically downward to the distal end, wherein the at least one protruding piece comprises a plurality of protruding pieces, wherein the protruding pieces are arranged only at the plurality of widthwise end portions of the bottom edge of the forming device, wherein a widthwise inner side end of a first of the plurality of protruding pieces extends outward in the first width direction to thereby define a convex curved line smoothly continuous with the distal end of the first of the plurality of protruding pieces, and wherein a widthwise inner side end of a second of the plurality of protruding pieces extends outward in the second width direction to thereby define a convex curved line smoothly continuous with the distal end of the second of the plurality of protruding pieces.

* * * * *